(12) United States Patent
Barnes et al.

(10) Patent No.: US 10,290,280 B2
(45) Date of Patent: May 14, 2019

(54) DISPLAYING COLOURS ON AN ELECTRONIC VISUAL DISPLAY

(71) Applicant: TINTOMETER GMBH, Dortmund (DE)

(72) Inventors: Nicholas J. Barnes, Salisbury (GB); Peter J. Clarke, Salisbury (GB)

(73) Assignee: TINTOMETER GMBH, Dortmund (DE)

(*) Notice: Subject to any disclaimer, the term of this patent is extended or adjusted under 35 U.S.C. 154(b) by 0 days.

(21) Appl. No.: 16/071,635

(22) PCT Filed: Jan. 27, 2017

(86) PCT No.: PCT/EP2017/051707
§ 371 (c)(1),
(2) Date: Jul. 20, 2018

(87) PCT Pub. No.: WO2017/129713
PCT Pub. Date: Aug. 3, 2017

(65) Prior Publication Data
US 2019/0035359 A1    Jan. 31, 2019

(30) Foreign Application Priority Data

Jan. 28, 2016   (EP) .................................... 16153191

(51) Int. Cl.
*G09G 5/02*   (2006.01)
*G06T 7/90*   (2017.01)
(52) U.S. Cl.
CPC ............. *G09G 5/02* (2013.01); *G06T 7/90* (2017.01); *G09G 2320/0666* (2013.01); *G09G 2340/06* (2013.01)

(58) Field of Classification Search
CPC .................................. G09G 5/02; G06T 7/90
See application file for complete search history.

(56) References Cited

U.S. PATENT DOCUMENTS

| | | | | |
|---|---|---|---|---|
| 5,594,558 | A | * | 1/1997 | Usami .................. H04N 1/6027 358/518 |
| 6,421,142 | B1 | | 7/2002 | Lin et al. |
| 6,778,185 | B1 | | 8/2004 | Moroney |
| 2002/0163669 | A1 | * | 11/2002 | Yamazaki ............ H04N 1/6058 358/3.23 |
| 2006/0061784 | A1 | * | 3/2006 | Sawada .................. G06T 11/001 358/1.9 |
| 2006/0120598 | A1 | * | 6/2006 | Takahashi ............... G06T 5/009 382/167 |

(Continued)

OTHER PUBLICATIONS

PCT International Search Report and Written Opinion dated Apr. 19, 2017 in Application No. PCT/EP2017/051707, 14 pages.

*Primary Examiner* — Phi Hoang
(74) *Attorney, Agent, or Firm* — Dilworth IP, LLC

(57) ABSTRACT

The present invention relates to a method of displaying colors on an electronic visual display. The colors correspond to a principal color and one or more auxiliary colors each of which is defined by color co-ordinates within a color space. When one or more of the colors is out of the gamut of the display, adjustments are made to the co-ordinates of each color to allow adjusted colors to be displayed that preserve the color differences between the principal color and each of the one or more auxiliary colors.

18 Claims, 7 Drawing Sheets

(56) References Cited

U.S. PATENT DOCUMENTS

| | | | |
|---|---|---|---|
| 2008/0309995 A1* | 12/2008 | Sasaki | H04N 1/6058 358/518 |
| 2009/0002737 A1* | 1/2009 | Kuno | H04N 1/6058 358/1.9 |
| 2011/0058197 A1 | 3/2011 | Kano | |
| 2011/0128438 A1* | 6/2011 | Yamashita | G06T 1/00 348/384.1 |
| 2012/0188390 A1 | 7/2012 | Sfaradi et al. | |
| 2012/0218569 A1* | 8/2012 | Shestak | H04N 1/6022 358/1.9 |

* cited by examiner

DISPLAYING COLOURS ON AN ELECTRONIC VISUAL DISPLAY

FIELD OF THE INVENTION

The present invention relates to displaying colours on an electronic visual display. In particular, the present invention relates to grading colours and displaying a measured sample colour along with one or more reference colours.

BACKGROUND TO THE INVENTION

Perceptions and interpretations of colour and colour comparisons are highly subjective and can depend on the observer's eye fatigue, age and other physiological factors. Instruments have been designed that can explicitly identify a colour by measuring a sample of the colour and comparing the measured colour to references or standards in a completely objective and accurate manner. These instruments can differentiate a colour from all other colours and can assign the colour a numeric value within a colour system (or colour space).

As is well known, colour is typically described utilising three elements: hue, chroma (also known as saturation) and value (also known as lightness). Hue and chroma are often illustrated in chromaticity diagrams that show colours represented in a horizontal plane. The colour spectrum that humans may perceive forms an irregular shape on this plane: hue varies with angle about an origin of the colour space and chroma varies with distance from the origin. Zero saturation is shown at the origin and this reference point is often called the white point. Pure hues are shown at the edge of the irregular shape with the hues changing as you travel around the edge. Diagrams showing a full colour space often represent hue and chroma in the horizontal plane as described above and represent lightness in the vertical direction. This may be envisaged as a cylindrical co-ordinate system with lightness being the vertical co-ordinate, chroma being the horizontal co-ordinate and hue being the angular co-ordinate.

Various colour spaces exist for the classification of colours, including those defined by the CIE (Commission Internationale de l'Eclairage). These colour spaces include CIEXYZ, CIELAB and CIELUV. CIEXYZ uses three tristimulus values, XYZ. Y relates to lightness but X and Z do not correlate to any visual attributes. To address this, the CIE designated chromaticity coordinates xy which can be correlated to chroma and hue, and which are derived from the tristimulus values, XYZ. These are convenient for use with chromaticity diagrams mentioned above. One issue with the xy chromaticity diagram is that different colours are not uniformly distributed. In an attempt to solve this problem, the CIE recommended two alternate approximately uniform colour spaces: CIE 1976 (L*a*b*) or CIELAB, and CIE 1976 (L*u*v*) or CIELUV.

In CIELAB, the colour space is defined by a Cartesian co-ordinate system. L* denotes lightness and is plotted on the z axis, a* denotes the red/green value and is plotted on the x axis and b* denotes the yellow/blue value and is plotted on the y axis. The resulting diagrams are as described above: the xy plane corresponds to a chromaticity diagram with saturation varying with distance from the origin and chroma varying with the angle about the origin. CIELUV is similar with L* denoting lightness, u* denoting the red/green value and v* denoting the yellow/blue value. CIELAB and CIELUV differ in the mathematical equations that define the colour spaces.

While both CIELAB and CIELUV use colour spaces defined by Cartesian co-ordinates, polar coordinate versions exist to specify colours in a cylindrical space and relate them to colour attributes. CIELCH is such an example. In this colour space, L* denotes lightness and is the z axis value, C* denotes the chroma value and is the distance from the origin, and h denotes the hue value and is the angular value.

With such colour spaces, it is possible not only to measure a colour, but also to measure the differences between colours. That is, a vector from the co-ordinates of one colour to the co-ordinates of another colour may be used to specify the difference in the two colours. The length of the vector represents the separation and hence distance between the colours. Knowing the colour difference can be useful during colour grading. For example, in colour grading, the colour of a sample relative to a set of known standard colours may be wanted, along with by how much the sample differs from the closest standard colour or colours. This may be used to determine whether a sample is within a specified tolerance of a desired colour. The specification of colours within CIELAB, CIELUV and CIELCH colour spaces allows colours to be compared in this way.

There are many known ways of measuring colour that may be employed according to circumstance. Some ways make use of light reflected from a sample, for example from a solid sample like paper or an opaque liquid sample like paint, while others make use of transmitted light, for example from a liquid sample like an oil or a beer. Other factors affect the colour measurement, such as the illuminant, the angle of the observer (for example 2° or 10° from the illuminant) and the sample spacing (for example taking readings every 5 nm or every 10 nm). Standards are available that set out how measurements should be taken and hence allow comparisons to be made objectively, for example those set out by ASTM International of Pennsylvania, USA. One example is ASTM E308 which defines standard practice for computing colours of objects by using the CIE system. Standards are also defined for determining colour differences. ASTM D2244 defines standard practice for calculation of colour tolerances and colour differences from instrumentally measured colour co-ordinates.

Colorimeters are available that measure the colour of a sample automatically. The colorimeter may also identify the nearest reference or standard colour to the sample, and may also provide the colour difference between the sample colour and the nearest reference colour. Usually, the colorimeter identifies the colours by providing the colour co-ordinates for the sample in a colour space rather than providing a display of the colours. This reflects the expense of providing a colour display on the colorimeter, and also problems in achieving an accurate reproduction of a colour on the display.

In particular, electronic visual displays can display only a limited range of colours, known as the gamut of the display. This gamut is generally smaller than the range of colours that may be perceived by the human eye. A gamut boundary defines the distinction between colours that may be reproduced by the display and hence are in-gamut, and colours that may not be reproduced and so are out-of-gamut. The gamut may be plotted on a chromaticity diagram such that the gamut boundary may be visualised. Typically, the gamut boundary forms an irregular shape.

Hence, there is a particular problem when a sample colour is outside of the gamut of the display. Accordingly, there is a desire to display colours on an electronic visual display that allows comparison of colours and that is not affected by the display gamut.

SUMMARY OF THE INVENTION

Against this background, and from a first aspect, the present invention resides in a method of displaying colours on an electronic visual display such as a television set, computer monitor, computer screen, or head mounted display, or similar. The colours correspond to a first colour and one or two further colours. In the following, the term principal colour will be used for the first colour, although it is to be understood that the terms "first colour" and "principal colour" may be used interchangeably. Also, in the following, the term auxiliary colour will be used for further colour, although it is to be understood that the terms "further colour" and "auxiliary colour" may be used interchangeably. The terms principal and auxiliary are merely labels to distinguish the colours, and do not necessarily imply a hierarchy. As will be explained in greater detail below, colour distances are measured between each further colour and the first colour: as the first colour is used in each distance measurement, it is referred to as the principal colour merely as a matter of convenience. Hence, one principal colour and one auxiliary colour is displayed or, alternatively, one principal colour and two auxiliary colours are displayed.

Each of the principal and auxiliary colours are defined by colour co-ordinates within a colour space. All colour co-ordinates disclosed within the summary of invention relate to the same colour space, for example a CIE colour space such as CIELAB, CIELUV or CIELCH.

The method comprises determining if one or more of the principal and auxiliary colours are out of the gamut of the display. If none of the colours are out of the gamut of the display, the method may comprise simply displaying the colours on the display.

However, if one or more of the principal and auxiliary colours are determined to be out of the gamut of the display, the method comprises the following steps.

The method comprises determining the most remote colour from the principal and auxiliary colours determined to be out of the gamut of the display. This is performed by identifying the colour with the colour co-ordinates that are furthest from the gamut boundary of the display.

The method further comprises determining a compression factor to bring the most remote colour within the gamut of the display. The method then comprises applying the compression factor to the colour co-ordinates for each of the principal and auxiliary colours to determine adjusted co-ordinates for each of the principal and auxiliary colours. As the compression factor was determined with respect to the most out-of-gamut colour, this step ensures that the adjusted co-ordinates for all the colours are in gamut and so may be displayed by the display.

However, the relative colour differences between the principal colour and each of the one or two auxiliary colours may not be preserved by this compression step. The present invention provides a way of ensuring the colour differences between the principal colour and each of the one or two auxiliary colours are preserved. Namely, the method further comprises determining compensated co-ordinates for the principal colour. This is performed to meet a condition that the separation between the principal colour and each of the one or two adjusted auxiliary colours is preserved. Namely, the distance between the compensated co-ordinates of the principal colour and the adjusted co-ordinates of each of the one or two auxiliary colours is matched to the distance between the colour co-ordinates of the principal colour and the colour co-ordinates of that auxiliary colour. For example, the distances may be matched to be equal. Alternatively, the distances may be matched to be substantially equal, for example such that the distances are equal to within a tolerated error, say 5%, 2% or 1% of the greater distance.

The method further comprises displaying, on the display, an adjusted principal colour corresponding to a colour having the compensated co-ordinates in the colour space and an adjusted auxiliary colour corresponding to a colour having the adjusted co-ordinates in the colour space for each of the one or two auxiliary colours. Thus, although at least one of the principal and auxiliary colours could not be displayed on the display, corresponding "adjusted" colours may now be displayed that preserve the colour differences between the principal colour and each of the one or two auxiliary colours. Thus, the differences in the colours may be visualised.

The method according to the present invention may be contrasted with other known methods of dealing with out-of-gamut colours. The problem of displaying out-of-gamut colours is most frequently encountered in the field of image reproduction. Here, images that typically contain many colours are displayed on an electronic visual display. There are two conventional ways of resolving the problem of how to display colours that are out of gamut.

(1) Any colour that is out of gamut is simply approximated to the nearest colour that is within the gamut, normally a colour on the gamut boundary. This effectively "clips" the image so that any colours beyond the gamut boundary are pulled back to the boundary and all colours within the gamut remain unchanged. A consequence is that any information relating to colour differences of colours that are out-of-gamut is entirely lost. For example, where two different colours are both out-of-gamut, both colours are displayed as the same colour.

(2) All colours are compressed by applying a compression factor that ensures all colours are brought within gamut. The same compression factor is applied to all colours: this can be imagined as all the colours moving towards the origin of the colour space, for example towards the white point in a chromaticity diagram. This compression means that all colours must change, and also that the differences between the colours lessens. Hence, while a difference between colours may be perceived on the display, the ability to make a true comparison between measured colours is lost.

The step of determining the most remote colour is straightforward where only one colour is determined to be out of the gamut of the display. Where more than one colour is determined to be out of gamut, various techniques may be used to identify the most remote colour. For example, the distance of the colours from the gamut boundary may be used to determine the most remote colour.

Optionally, determining the most remote colour comprises obtaining boundary co-ordinates for the principal and auxiliary colours on, or near, the gamut boundary for each of the principal and auxiliary colours determined to be out of the gamut of the display. The boundary co-ordinates need not lie exactly on the gamut boundary, and small deviations from the gamut boundary may be tolerated. This may be performed by mapping from the colour co-ordinates of the colour towards a reference point in the colour space. The reference point may have co-ordinates within the gamut of the display or they may be out-of-gamut (for example, a point beyond the gamut boundary on the opposite side of the gamut). The method may then comprise determining, for each of the principal and auxiliary colours determined to be out of the gamut of the display, an out-of-gamut distance between the boundary co-ordinates and the colour co-ordinates of the colour. The method may comprise determining the most remote colour from the out-of-gamut distances by identifying the colour with the greatest out-of-gamut distance. Obtaining boundary co-ordinates of the principal and auxiliary colours on the gamut boundary of the display may comprise, for each of the principal and auxiliary colours, determining where a line extending from the colour co-ordinates of the colour to the reference point intersects the gamut boundary.

Any colour space may be used, for example colour system spaces as defined by the CIE, or colour spaces based on RGB values or CMYK values. These colour spaces reflect values of lightness, chroma and hue of any particular colour. For some systems, such as the CIELAB, CIELUV and CIELCH colour spaces, these relationships are easier to see in the co-ordinates, whereas the relationships are not so easy to see in other colour spaces such as the tristimulus values provided by the CIEXYZ colour space. In any event, a line may be defined within a colour space that preserves one or more of lightness, saturation and hue. Optionally, the method may comprise obtaining boundary co-ordinates of the principal and auxiliary colours by determining where a line extending from the colour co-ordinates of the colour to the reference point that preserves a constant hue intersects the gamut boundary. For example, when visualised in the CIELAB, CIELUV or CIELCH colour spaces which are generally plotted with lightness on the vertical axis and hue and saturation represented in the horizontal plane, the line may extend radially towards the reference point that corresponds to the origin of the co-ordinate system, i.e. the central point that has zero saturation and zero hue (e.g. the white point). The reference point may be selected to have a lightness co-ordinate matching that of the initial co-ordinates of the principal colour. Alternatively, the reference point may be selected to have a lightness co-ordinate within the range extending from the maximum and minimum lightness values of the initial co-ordinates of the principal and auxiliary colours.

Thus, the reference point may be chosen to the origin of the colour space. Where the principal and auxiliary colours are similar, a reference point corresponding to a complementary colour may be chosen. For example, where the principal and auxiliary colours all lie within one half of the colour space, a reference point may be chosen from the other half of the colour space.

Optionally, determining a compression factor to bring the most remote colour within the gamut of the display comprises the following. The compression factor may be set as the ratio of distances, namely the distance between the reference point and the boundary co-ordinates of the most remote colour, and the reference point and the initial co-ordinates of the most remote colour. This may be performed in combination with setting the reference point to be the origin of the co-ordinate system, as described above. If so, the compression factor may be set to be equal to this ratio: this will see the most remote colour assigned adjusted co-ordinates that lie on the gamut boundary. This ensures that the adjusted colours displayed are as close to the principal and auxiliary colours as possible. However, it may be preferred to provide a slight offset, i.e. to see the most remote colour assigned adjusted co-ordinates that lie just within the gamut boundary. This may be done by setting the scaling factor to be equal to the product of a scaling factor and the ratio described above. The scaling factor may have a value in the range from 0.5 to 1, for example within the range 0.75 and 0.95.

The compression factor may be found in other ways. For example, an iterative approach may be used. An estimated compression factor may be generated and applied to the boundary co-ordinates of each of the principal and auxiliary colours to determine adjusted co-ordinates for each of the principal and auxiliary colours. Next, a determination may be made as to whether the adjusted co-ordinates for each of the principal and auxiliary colours are within the gamut of the display. If not, the method may comprise repeatedly (1) generating an estimated compression factor, (2) applying the estimated compression factor to the boundary co-ordinates for each of the principal and auxiliary colours to determine adjusted co-ordinates for each of the principal and auxiliary colours, and (3) determining whether the adjusted co-ordinates for each of the principal and auxiliary colours are within the gamut of the display, until the adjusted co-ordinates for each of the principal and auxiliary colours are determined to be within the gamut of the display. At each iteration, the scaling factor may be decreased to bring the most remote colour closer to the reference point.

Determining compensated co-ordinates for the principal colour may comprise adjusting the co-ordinates from the adjusted co-ordinates of the principal colour so as to preserve the hue of the principal colour. That is, the hue may be preserved such that the adjusted principal colour has the same hue as the principal colour. The lightness may also be preserved, i.e. the principal colour may be adjusted such that only its saturation changes. This is particularly advantageous when the reference point is set to be the origin of the co-ordinate system, for example when using the CIELAB, CIELUV or CIELCH colour spaces, for instance as described above. According to this method, all colours are compressed such that, in effect, the colours move along a radial towards the reference point such that the adjusted colours are all within gamut, and then the principal colour is moved further towards the reference point to ensure that the differences are preserved. Which colour attributes are adjusted may be varied according to the geometry of the particular situation. For example, where the chroma of the principal colour lies between the chroman of the one or two auxiliary colours, adjustment of the hue and/or lightness may be required to preserve colour difference. Multiple attempts that see different combinations of the saturation, lightness and hue changed may be made to ensure that the compensated co-ordinates are not moved back out-of-gamut.

Optionally, the method may further comprise checking the compensated co-ordinates of the principal colour and the adjusted co-ordinates of the one or two auxiliary colours to ensure than none have moved out-of-gamut as a result of compensating the adjusted co-ordinates of the principal colour. Only the most remote colour or only the principal colour may be checked to determine if they are out-of-gamut. If a colour is determined to be out-of-gamut, then the compression factor may be recalculated. For example, the scaling factor may be decreased. This will bring the most remote colour further back within gamut. Alternatively, if a colour is determined to be out-of-gamut, the reference point may be moved. For example, the reference point may be moved to be closer to the origin of the colour space or may be moved to the origin. As noted above, a further alternative is to attempt adjusting different combinations of the co-ordinate values for saturation, lightness and hue.

The invention described above may be put to many uses. In a general sense, the invention may be used simply to display multiple colours even notwithstanding the limitations imposed by the gamuts of typical electronic visual displays. For example, this may be used in displaying an image on an electronic visual display.

However, an advantage of the invention described above is the adjustment of colours that are out-of-gamut for a display such that the colours may be displayed while preserving the differences in the colours. This is particularly advantageous when colours are being compared. For example, the invention described above may find useful application in colour grading or colour matching, namely grading or matching a sample colour against a set of reference or standard colours. In this case, the sample colour will correspond to the first and principal colour described above, while the reference or standard colours will correspond to the further or auxiliary colours described above.

Hence, the present invention also extends to a method of grading or matching the colour of a colour sample and displaying a colour and one or two other colours to illustrate the colour grading/matching performed. The method comprises measuring the colour of the sample to determine colour co-ordinates of the sample colour that define the colour in a colour space. The method further comprises identifying one or two reference colours that correspond to the principal colour and obtaining the colour co-ordinates of the identified one or two reference colours that define the colours in a colour space. The one or two reference colours may comprise one or two standard colours, for example one or two colours selected from a set of standard colours.

Identifying one or two reference colours may comprise the following steps. Candidate reference colours may be selected, and colour co-ordinates of the candidate reference colours that define the colours in a colour space may be obtained. The distance between the colour co-ordinates of the sample colour and the colour co-ordinates of each of the candidate reference colours may be determined. The one or two candidate reference colours having the shortest distances may be selected to be the one or two reference colours. For example, two reference colours corresponding to the two candidate reference colours having the shortest distances may be selected.

Selecting the candidate reference colours may comprise selecting one or two reference colours defined by an industry specific colour scale. These colour scales may be linear, for instance to provide a linear or one dimensional series of colours. Examples of one dimensional industry specific colour scales include the ASTM colour scales (used commonly in the grading of petroleum products, e.g. ASTM D 1500, ASTM D 6045, ISO 2049 and IP 196), the EBC scale (European Brewing Scale used for grading beers, malts, caramel solutions and other similarly coloured liquids), the European Pharmacopoeia colour scale, the Gardner Colour scale (used for grading similarly coloured liquids such as resins, varnishes, lacquers, drying oils, fatty acids, lecithins, sunflower oil and linseed oil), the Platinum-Cobalt/Hazen/APHA Colour scale (used for grading clear to dark amber liquids, for example in the water industry and also for industries relating to clear oils, chemicals and petro-chemicals such as glycerine, plasticisers, solvents, carbon tetrachloride and petroleum spirits), the Saybolt Colour scale (used for grading light coloured petroleum products including aviation fuels, kerosene, napthas, white mineral oils, hydrocarbon solvents and petroleum waxes), and white and yellow indices (used to grade whiteness and yellowness, for example in the paint and paper industries).

Any of the above methods that include grading a colour may further comprise displaying colours on an electronic visual display as described with respect to the first aspect of the invention. That is, as noted above, the sample colour will correspond to the principal colour described above, and the reference colours will correspond to the auxiliary colours described above.

Hence, the method may further comprise displaying colours on an electronic visual display such as a television set, computer monitor, computer screen, or head mounted display. The colours correspond to the sample colour and the one or two reference colours. For example, the sample principal colour and two reference colours may be displayed, namely the two reference colours that have been determined to be the closest to the sample colour, as described above.

The method may comprise determining if one or more of the sample and reference colours are out of the display gamut. If none of the colours are out of the display gamut, the method may comprise simply displaying the sample and reference colours on the display. This allows a user to see the sample colour, and the reference colours that best match the sample colour. For example, the closest reference colour may be displayed so that the user may see how close the sample colour matches the nearest reference colour. For many colour grading applications, particularly those employing a linear colour scale, the sample colour is likely to be between sample colours. Thus, the two closest reference colours may be displayed, one to either side of the sample colour. Of course, the colour difference between the colours is preserved in this method.

However, if one or more of the sample and reference colours are determined to be out of the display gamut, the method may comprise the following steps.

The method may comprise determining the most remote colour from the sample and reference colours determined to be out of the display gamut. This is performed by identifying the colour with the colour co-ordinates that are furthest from the gamut boundary of the display. The method may further comprise determining a compression factor to bring the most remote colour within the display gamut. The method then comprises applying the compression factor to the colour co-ordinates for each of the sample and reference colours to determine adjusted co-ordinates for each of the sample and reference colours. As the compression factor was determined with respect to the most out-of-gamut colour, this step ensures all the colours are in gamut and so may be displayed.

However, the relative differences between the sample colour and the one or more reference colours may not be preserved by this compression step. The present invention provides a way of ensuring the differences between the sample colour and the one or two reference colours is preserved.

The method may further comprise determining compensated co-ordinates for the sample colour. This is performed to meet a condition that, for all pairs of the sample colour and one of the one or two reference colours, their separation is preserved. Namely, for all pairs of the sample colour and one of the one or two reference colours, the distance between the compensated co-ordinates of the sample colour and the adjusted co-ordinates of each reference colour is matched to the distance between the colour co-ordinates of the sample colour and the colour co-ordinates of the reference colour. The distances between the colour co-ordinates of the sample colour and each of the colour co-ordinates of the one or two reference colours may be those distances determined when selecting the reference colours. The distances may be matched to be equal. Alternatively, the distances may be matched to be substantially equal, for example such that the distances are equal to within a tolerated error of 5%, 2% or 1% of the greater distance.

The method may further comprise displaying, on the display, an adjusted sample colour corresponding to a colour having the compensated co-ordinates in the colour space and an adjusted reference colour corresponding to a colour having the adjusted co-ordinates in the colour system for each of the one or two reference colours. Thus, although at least one of the sample and one or two reference colours could not be displayed, corresponding colours may now be displayed that preserve the differences between the sample colour and each of the one or two reference colours. As noted above, this is not possible according to prior art methods. Either the colour differences would be lost altogether where "clipping" is performed, or incorrect colour differences would be displayed where a compression factor was applied to all colours.

Advantageously, this method allows a user to see the sample colour and one or two reference colours that best match the sample colour. This is in contrast to prior art colorimeters that merely provide a numerical identification of a colour, for example using co-ordinates in a colour space, or a textual identification, for example by reference to a standard colour. According to the present invention, the closest one or two reference colours may be displayed so that the user receives a visual confirmation that the correct match has been made and so that the user may see how close the sample colour matches the nearest one or two reference colours. For many colour grading applications, particularly those employing a linear colour scale, the sample colour is likely to be between sample colours. Thus, the two closest reference colours may be displayed, one to either side of the sample colour. Thus, the differences in the colours may be visualised which, as will be appreciated, is highly beneficial when colour grading.

Determining the most remote colour is straightforward where only one colour is determined to be out of the gamut of the display. Where more than one colour is determined to be out of gamut, various techniques may be used to identify the most remote colour. For example, the distance of the colours from the gamut boundary may be used to determine the most remote colour.

Optionally, determining the most remote colour comprises obtaining boundary co-ordinates for the sample and reference colours on or near the gamut boundary for each of the sample and reference colours determined to be out of the display gamut. The boundary co-ordinates need not lie exactly on the gamut boundary, and small deviations from the gamut boundary may be tolerated. This may be performed by mapping from the colour co-ordinates of the colour towards a reference point in the colour space. The reference point may have co-ordinates within the gamut of the display or they may be out-of-gamut (for example, a point beyond the gamut boundary on the opposite side of the gamut), as described above. The method may then comprise determining, for each of the sample and reference colours determined to be out of the display gamut, an out-of-gamut distance between the boundary co-ordinates and the colour co-ordinates of the colour. The method may comprise determining the most remote colour from the out-of-gamut distances, by identifying the colour with the greatest out-of-gamut distance. Obtaining boundary co-ordinates of the sample and reference colours on the gamut boundary of the display may comprise, for each of the sample and reference colours, determining where a line extending from the colour co-ordinates of the colour to the reference point intersects the gamut boundary.

Optionally, determining a compression factor to bring the most remote colour within the display gamut comprises the following. The compression factor may be set as the ratio of distances, namely the distance between the reference point and the boundary co-ordinates of the most remote colour, and the reference point and the initial co-ordinates of the most remote colour. This may be performed in combination with setting the reference point to be the origin of the co-ordinate system, as described previously. If so, the compression factor may be set to be equal to this ratio: this will see the most remote colour assigned adjusted co-ordinates that lie on the gamut boundary. This ensures that the adjusted colours displayed are as close to the sample and reference colours as possible. However, it may be preferred to provide a slight offset, i.e. to see the most remote colour assigned adjusted co-ordinates that lie just within the gamut boundary. This may be done by setting the scaling factor to be equal to the product of a scaling factor and the ratio described above. The scaling factor may have a value in the range from 0.5 to 1, for example within the range 0.75 and 0.95.

The compression factor may be found in other ways. For example, an iterative approach may be used. An estimated compression factor may be generated and applied to the boundary co-ordinates of each of the sample and reference colours to determine adjusted co-ordinates for each of the sample and reference colours. Next, a determination may be made as to whether the adjusted co-ordinates for each of the sample and reference colours are within the display gamut. If not, the method may comprise repeatedly (1) generating an estimated compression factor, (2) applying the estimated compression factor to the boundary co-ordinates for each of the sample and reference colours to determine adjusted co-ordinates for each of the sample and reference colours, and (3) determining whether the adjusted co-ordinates for each of the sample and reference colours are within the display gamut, until the adjusted co-ordinates for each of the sample and reference colours are determined to be within the display gamut. At each iteration, the scaling factor may be decreased to bring the most remote colour closer to the reference point.

Determining compensated co-ordinates for the sample colour may comprise adjusting the co-ordinates from the adjusted co-ordinates of the sample colour so as to preserve the hue of the sample colour. That is, the hue may be preserved such that the adjusted sample colour has the same hue as the sample colour. The lightness may also be preserved, i.e. the sample colour may be adjusted such that only its saturation changes. This is particularly advantageous when the reference point is set to be the origin of the co-ordinate system, for example when using the CIELAB, CIELUV or CIELCH colour systems, for instance as described above. According to this method, all colours are compressed such that, in effect, the colours move along a radial towards the reference point such that the adjusted colours are all within gamut, and then the sample colour is moved further towards the reference point to ensure that the differences are preserved. Which colour attributes are adjusted may be varied according to the geometry of the particular situation. For example, where the chroma of the sample colour lies between the chroman of the one or two reference colours, adjustment of the hue and/or lightness may be required to preserve colour difference. Multiple attempts that see different combinations of the saturation, lightness and hue changed may be made to ensure that the compensated co-ordinates are not moved back out-of-gamut.

Optionally, the method may further comprise checking the compensated co-ordinates of the sample colour and the adjusted co-ordinates of the one or two reference colours to ensure than none have moved out-of-gamut as a result of compensating the adjusted co-ordinates of the sample colour. Only the most remote colour or only the sample colour may be checked to determine if they are out-of-gamut. If a colour is determined to be out-of-gamut, then the compression factor may be recalculated or the reference point may be moved. For example, the scaling factor may be decreased. This will bring the most remote colour further back within gamut. Alternatively, if a colour is determined to be out-of-gamut, the reference point may be moved. For example, the reference point may be moved to be closer to the origin of the colour space or may be moved to the origin. As noted above, a further alternative is to attempt adjusting different combinations of the co-ordinate values for saturation, lightness and hue.

As will be appreciated, any of the methods described above may be computer-implemented. The present invention also extends to computer program that, when executed on a computer processor, causes the processor to perform any of the above methods; a computer comprising a computer processor, computer memory and an electronic visual display, wherein the computer memory has stored therein a computer program that, when executed on a computer processor, causes the processor to perform any of the methods of displaying colours described above; and a colorimeter comprising a computer processor, computer memory and an electronic visual display, wherein the computer memory has stored therein a computer program that, when executed on a computer processor, causes the processor to perform any of the methods of grading the colour of a colour sample described above.

BRIEF DESCRIPTION OF THE DRAWINGS

In order that the invention can be more readily understood, reference will now be made by way of example only, to the accompanying drawings in which.

DETAILED DESCRIPTION OF THE INVENTION

Figure 1:
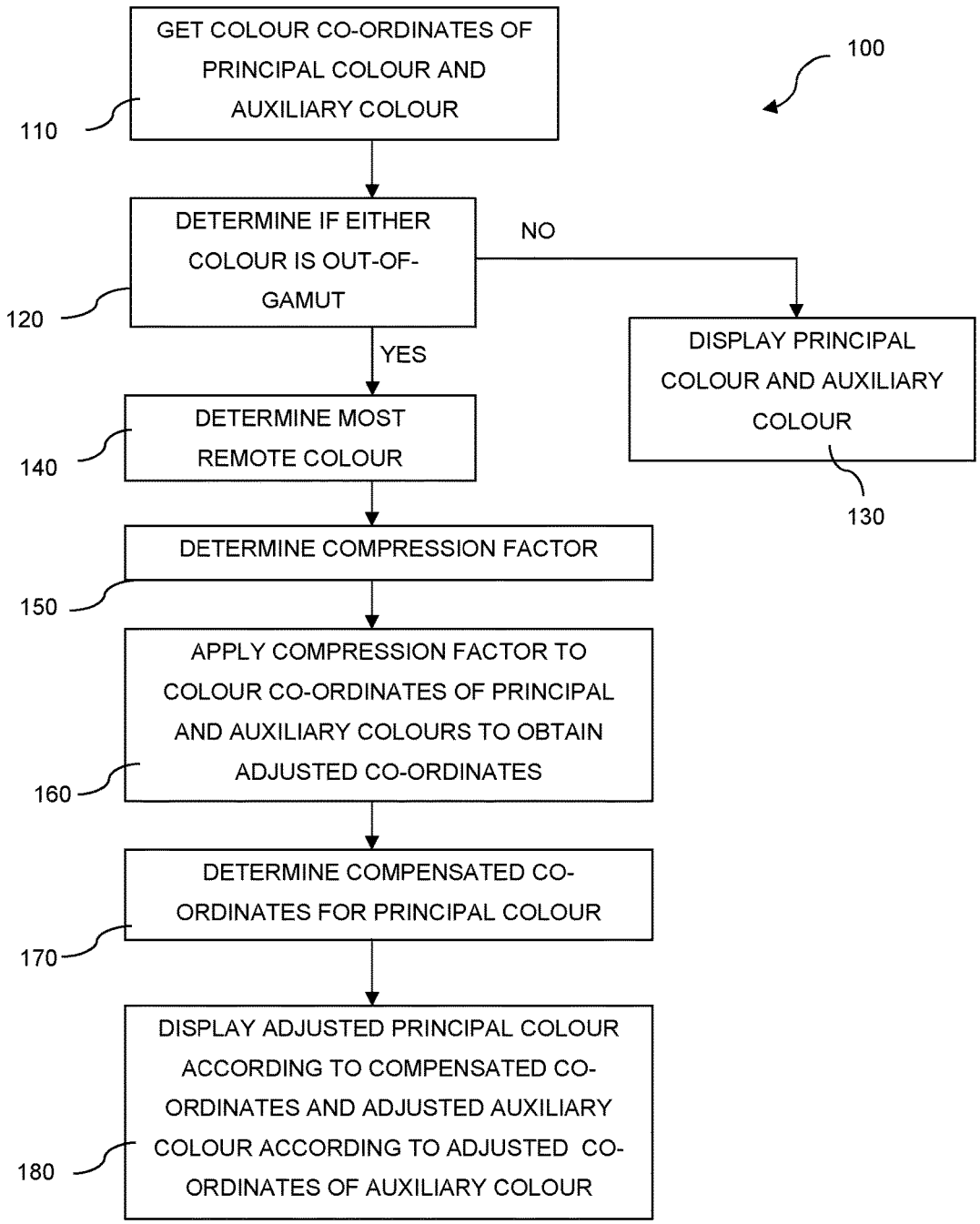
FIG. 1 is a schematic representation of a method of displaying two colours on an electronic visual display according to a first embodiment of the invention.

A computer-implemented method 100 of displaying two colours on an electronic visual display is shown in FIG. 1.

The computer comprises at least a computer processor, memory and a display upon which the colours will be shown.

The method 100 starts at 110 where the colour co-ordinates of two colours are obtained. One colour corresponds to the principal colour described above and the other colour corresponds to the auxiliary colour described above. The colour co-ordinates may define the colours in any colour space although, in this example, the use of colour co-ordinates in the CIELAB colour space is discussed. To obtain the colour co-ordinates, the co-ordinates may be measured, or they may be looked up from a database or other source of information that provides such data. For example, the principal colour may correspond to the colour of a sample such as a painted article that is measured. The auxiliary colour may be a reference colour, for example a desired colour for the article. The colour co-ordinates of the desired colour may be pre-determined, and hence may be retrieved from the computer memory. Showing the colours on the display may provide an indication of how well the actual sample colour matches the desired colour.

At 120, the processor determines if any of the colours are out-of-gamut for the display. The computer has stored in its memory information defining the gamut of its display, and so compares the colour co-ordinates of the colours to this stored gamut information. For example, information describing the gamut may be stored in the memory as a look-up table.

If the determination at 120 indicates that neither the principal colour nor the auxiliary colour is out-of-gamut, the method 100 proceeds to step 130 where the processor causes the display to show the principal colour and the auxiliary colour. The colours may be displayed as an area of each colour, for example two squares or rectangles filled with the respective colour. The colours may be displayed adjacent one another, for example side by side or one above the other.

Figure 2:
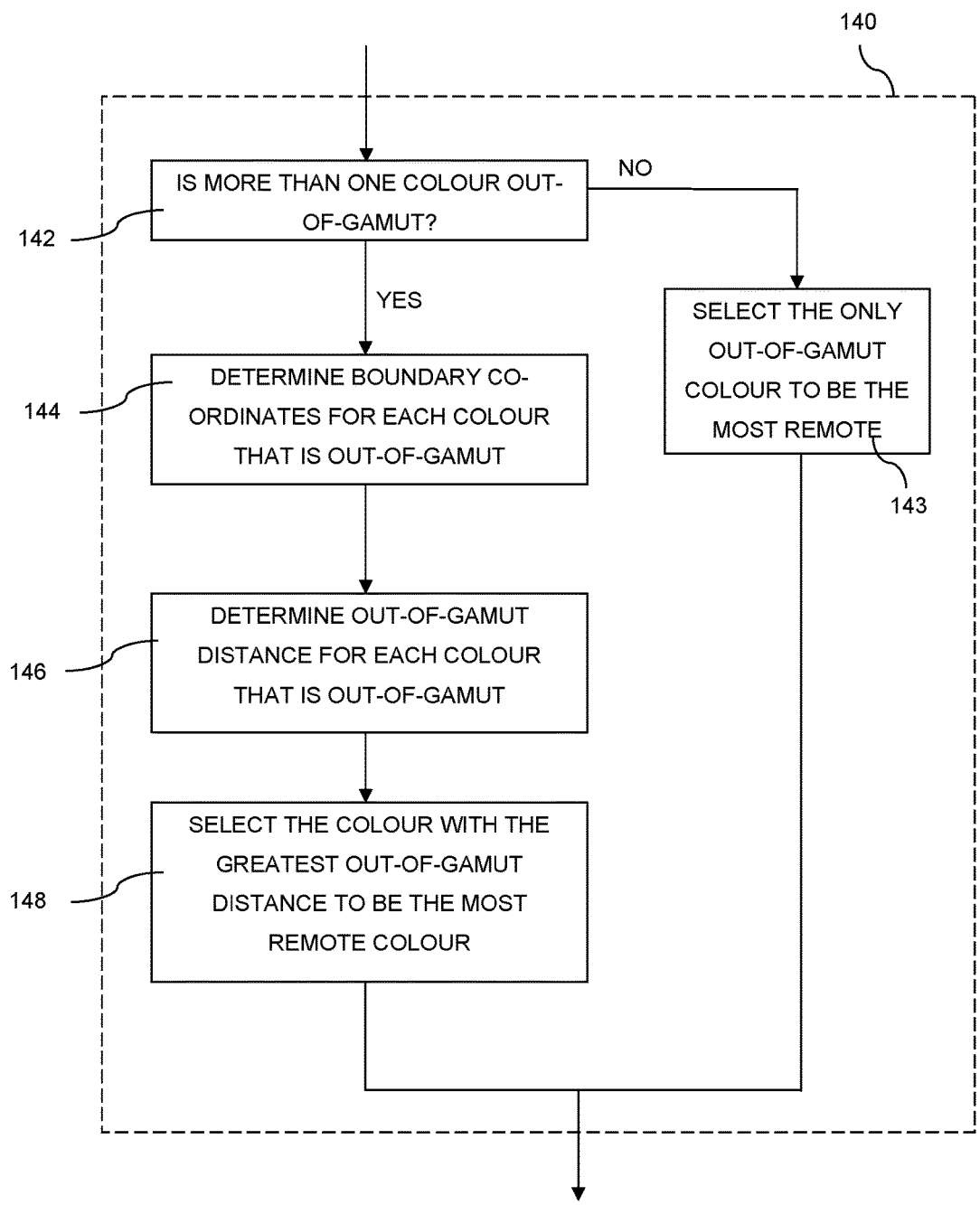
FIG. 2 is a schematic representation showing the step of determining the most remote colour from FIG. 1 in greater detail.

However, if the processor determines that either one or both of the colours is out-of-gamut, the method 100 proceeds to step 140 where a procedure to bring the colours back into gamut in started. At step 140, the most remote colour is determined. This may be done in many ways. If only a single colour is determined to be out-of-gamut, then this colour is selected as the most remote colour. Where both colours are out-of-gamut, a distinction must be made between the colours. For example, a user may select the most remote colour, such as by selecting the colour from a diagram shown on the display to indicate the relative positions of the gamut and the colour co-ordinates of the colours. Alternatively, the processor may calculate the most remote colour, for example by determining the distance of the colours from a fixed point or from the gamut boundary. An example of such a method is shown in FIG. 2 and is described below.

Once the most remote colour has been determined at step 140, the processor determines a compression factor at step 150 that will bring the most remote colour back into gamut. That is, a factor is calculated that when applied to the colour co-ordinates of the most remote colour, will see the co-ordinates shifted to new values that are within the display gamut. This may be done in many ways. An example is provided in the following description of the second embodiment of the present invention that may be employed here with the first embodiment.

Next, the method 100 proceeds to step 160 where the processor applies the compression factor to the colour co-ordinates of the principal colour and the auxiliary colour to obtain adjusted co-ordinates for each colour. Of course, these adjusted co-ordinates define new colours, but each colour is associated with either the principal or auxiliary colour, and the adjusted colours correspond to a translation of actual colours to bring them back into the display gamut.

At step 170, the processor determines compensated co-ordinates for the principal colour to preserve the colour difference between the principal colour and the auxiliary colour. That is, the computer performs a calculation to derive compensated co-ordinates in the colour space for the adjusted principal colour that yield the same distance to the adjusted co-ordinates of the adjusted auxiliary colour as was the case for the colour co-ordinates of the actual principal and auxiliary colours. Therefore, the colour separation of the adjusted colours is the same as for the actual colours. How the compensated co-ordinates are found is described in more detail below with respect to the second embodiment, and the method may be used here with the first embodiment.

Finally, at step 180, the processor causes the display to show the adjusted colours, i.e. an adjusted principal colour defined by the compensated co-ordinates of the principal colour and an adjusted auxiliary colour defined by the adjusted co-ordinates of the actual auxiliary colour. The adjusted colours may be displayed in the same way as was described for the actual colours at step 130 as described above.

FIG. 2 illustrates one way of determining the most remote colour, i.e. the colour most out-of-gamut. At step 142, the processor determines if more than one colour is out-of-gamut. If it is found that only one colour is out-of-gamut, then that colour is selected to be the most remote colour at step 143.

However, if both the principal colour and the auxiliary colour are determined to be out-of-gamut, then the processor must calculate which colour is the most remote. In this example, there are only two colours. In embodiments of the present invention where more than two colours are to be displayed, then the determination is required where two or more colours are determined to be out-of-gamut. The following steps shown in FIG. 2 are then applied to the set of colours that are determined to be out-of-gamut, and not to any colours that were not found to be out-of-gamut (as obviously none of the in-gamut colours cannot be the most remote colour).

At step 144, boundary co-ordinates for the principal and auxiliary colours are determined. These boundary co-ordinates correspond to a mapping of the principal and auxiliary colours back onto the gamut boundary. For example, an algorithm may be used to determine the closest point on the gamut boundary by minimising the distance between the boundary co-ordinates and the colour co-ordinates. Alternatively, a mapping may be made that preserves a quality of the colour, for example that maps the colour co-ordinates along a line of constant hue. This may be visualised on a chromaticity diagram as travelling along a radial of constant hue but decreasing chroma towards the white point that represents zero saturation.

At step 146, the processor calculates out-of-gamut distances for each colour equal to the distance between the boundary co-ordinates and the colour co-ordinates for the principal colour and the auxiliary colour, thereby deriving the remoteness of each colour from the gamut boundary. The processor then selects the colour having the greatest out-of-gamut distance to be the most remote colour at step 148. The method of FIG. 1 may then continue to step 150 where the compression factor is determined with reference to the most remote colour.

Features of the general method described above will now be described in a different context. The method above was described in the context of displaying a pair of colours, namely a principal colour and an auxiliary colour. In the second embodiment of the invention described below, the general method is applied to grading the colour of a colour sample, for example grading the colour of a sample against the two closest matches in a one-dimensional colour scale such as those mentioned above. Here, the colour to be graded may be regarded as the principal colour and the two closest matching colours may be regarded as two auxiliary colours. As discussed above, when a sample is graded against standards provided on a one-dimensional scale, the sample colour is likely to exist in the colour space between two of the standards, so it useful to display the sample colour next to the closest match from either side of the sample colour. However, as will be appreciated, the two embodiments present merely exemplary contexts for the general method, whereas many more applications exist.

Figure 3:
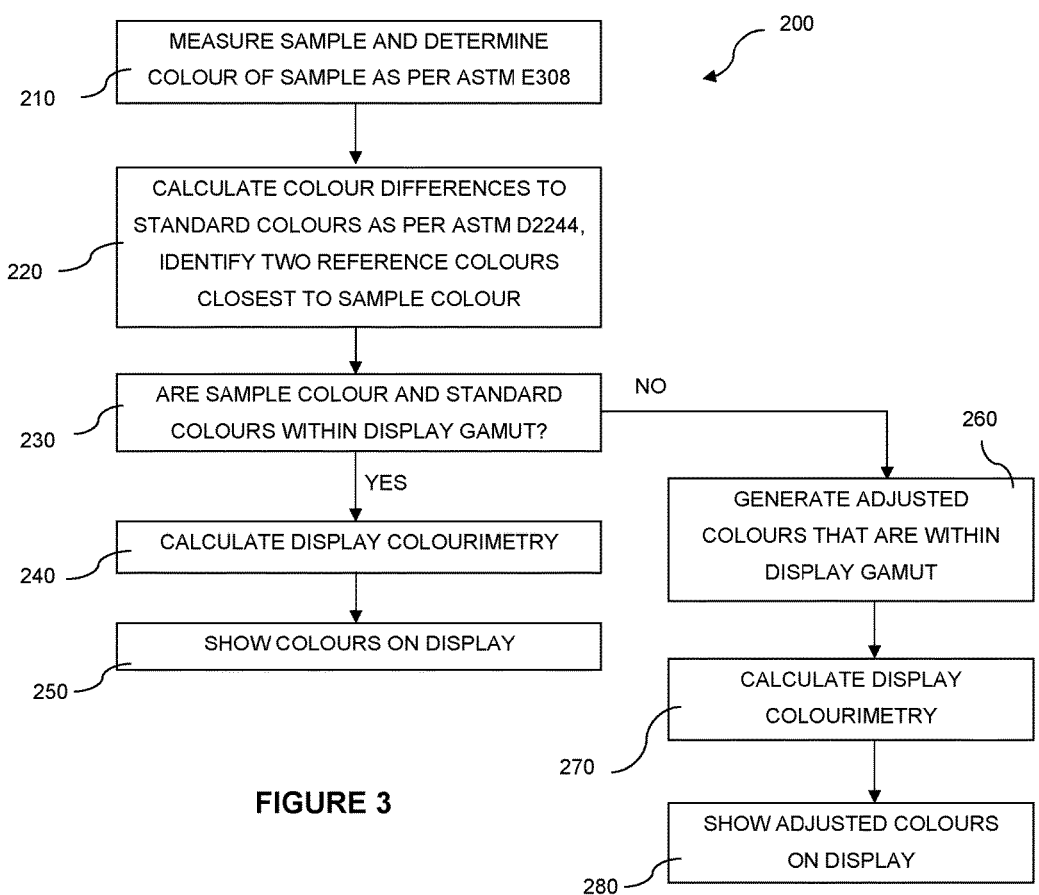
FIG. 3 is a schematic representation of a method of grading a colour of a sample according to a second embodiment of the invention.

FIG. 3 shows a method 200 of grading the colour of a sample. In this example, the method is implemented by a colorimeter. The colorimeter comprises at least apparatus for measuring the colour of the sample, a computer processor, memory and a display upon which colours will be shown. At step 210, the colorimeter measures the sample and determines the colour of the sample. Although any conventional method of determining the sample colour may be employed, in this particular example the colour of the sample is determined according to the ASTM E308 standard. This produces a colour co-ordinate for the sample colour in the CIELAB colour space.

The colorimeter will be set to compare the sample colour to a set of reference colours. This may be a complete set of all colours, for example the entire colour spectrum as defined in a CIELAB colour space. However, in this example, the colorimeter is set to measure the sample colour against a one-dimensional set of a limited number of colour standards. For instance, the sample may be a sample of a beer to be measured against standards according to the European Brewing Convention. These references allow beers, malts and caramel solutions to be graded. The scale has a range from 2 to 27 visual units (for example, as measured on the Lovibond® scale or the ASTM scale). These colours range from yellower pale worts and lagers to the amber of dark worts, beers and caramels and to the very dark colours of stouts. The colour standards are stored in the memory of the colorimeter. The colours may be measured and stored, or the colours may be downloaded and then stored. The colours are identified by colour co-ordinates and may also be identified by name or a label, for example indicating their value on a scale like the Lovibond® or ASTM scale.

At step 220, the processor calculates the colour differences from the sample colour to each of the standard colours. That is, the processor calculates the distance from the colour co-ordinates of the sample colour and the colour co-ordinates of each of the standard colours. This may be performed according to any method although, in this example, the differences are obtained according to the ASTM D2244 standard. This uses the colour co-ordinates as expressed in CIELAB colour space to obtain the distances as $\Delta E^*_{ab}$.

Figure 5:
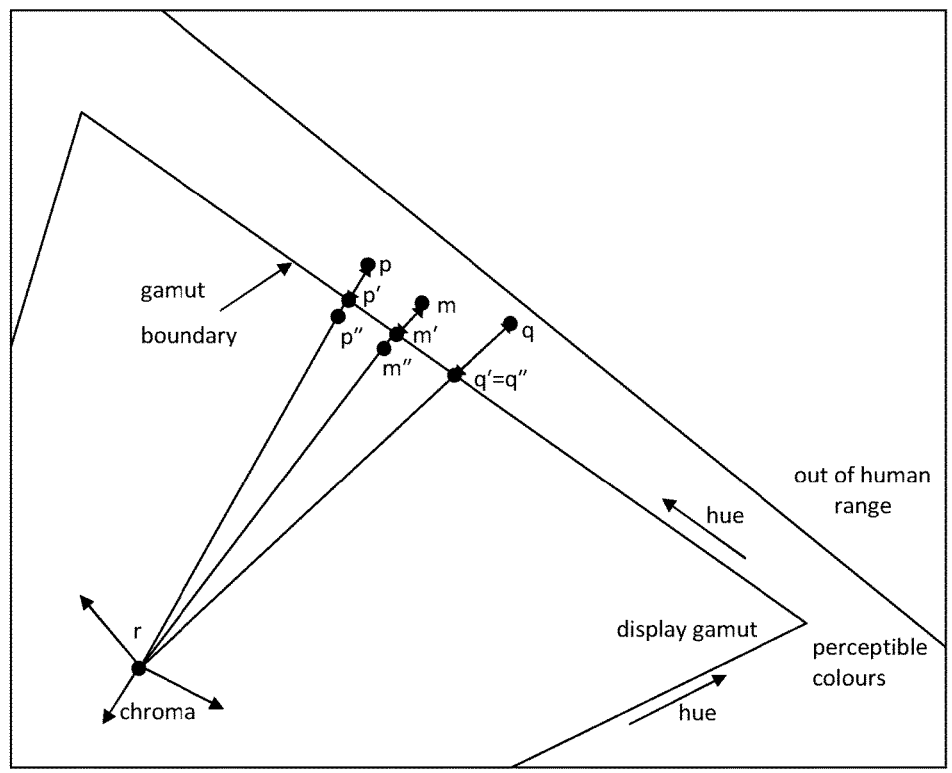
FIG. 5 is shows a chromaticity diagram providing an approximate illustration of the range of human colour perception and a display gamut, and showing how the co-ordinates of a sample colour (m) and two standard colours (p, q) are adjusted to bring the colours back into the display gamut.

FIG. 5 shows the sample colour point, m, and two of the standard colours, p and q, plotted on a chromaticity diagram. The colour differences between the sample colour and the two standard colours swatches are given by p ($\Delta E^*_{ab_{mp}}$) and q ($\Delta E^*_{ab_{mq}}$), as follows.

$$\Delta E^*_{ab_{mp}} = \sqrt{(L^*_m - L^*_p)^2 + (a^*_m - a^*_p)^2 + (b^*_m - b^*_p)^2} \quad (1)$$

$$\Delta E^*_{ab_{mq}} = \sqrt{(L^*_m - L^*_q)^2 + (a^*_m - a^*_q)^2 + (b^*_m - b^*_q)^2} \quad (2)$$

The colour differences to the other standard colours are similarly computed. The processor selects the pair of standard colours having the smallest distances $\Delta E^*_{ab}$ for display to the user. The standard having the smallest difference will be identified as the best match, and the other standard will be identified as the second best match. The two standard colours p and q shown in FIG. 5 are taken to be the closest standards in the following description.

At step 230, the processor determines whether any of the sample and standard colours are out of the display gamut. This may be done as was previously described in respect of step 120 of FIG. 1.

If none of the colours are found to be out-of-gamut, the method continues to step 240 where the processor performs a conversion to allow the actual sample and the actual standard colours to be shown on the display. This conversion sees the colour co-ordinates of the sample and standard colours transformed from CIELAB co-ordinates to their equivalent co-ordinates in a colour space appropriate to the display, for example a conversion into a sRGB colour space. Such conversion is a matter of routine to those skilled in the art who will be aware of suitable transform functions for this purpose. Then, at step 250, the actual sample colour and the actual standard colours are shown on the display.

If at least one of the colours was found to be out-of-gamut, the processor adjusts the colours so that they are brought back into gamut, as indicated at step 260. Once this has been done, the method proceeds to steps 270 and 280. Steps 270 and 280 are equivalent to steps 240 and 250 already described, but are performed with respect to the adjusted colours rather than the actual colours. Hence, the adjusted colours are converted into a new colour space and then shown on the display.

Step 260 will now be described in greater detail, with reference to FIG. 4. At step 262, for the out-of-gamut colours, boundary co-ordinates for each colour are determined by the processor. These boundary co-ordinates lie on the gamut boundary. How they are determined may be visualised as drawing straight lines between the out-of-gamut colours and a reference point. In this example, the white point having zero saturation is chosen to be the reference point (e.g. the origin of the colour co-ordinate system, thereby ensuring the reference point is in gamut). Therefore, the lines all extend along directions having constant hue. The boundary co-ordinates are the points where the line crosses the display gamut boundary. This is shown in FIG. 5 where the points corresponding to the boundary co-ordinates of each out-of-gamut colour are shown as m', p' and q'.

Reference points other than the origin or the white point having zero saturation may be chosen as the reference point. If the colours under consideration have similar hues, a reference point with a colour co-ordinate corresponding to a complementary colour may be chosen as the reference point. For example, if the colours are different shades of yellow, a reference point from the blue part of the colour spectrum may be chosen.

Also, the reference point need not be in gamut. Returning to the example described immediately above, where the colours are shades of yellow, a reference point may be chosen from beyond the blue part of the in-gamut colour space. As will be described below, this may have advantages when adjusting the colours to bring them back in gamut.

At step 263, the processor computes out-of-gamut distances for each of the out-of-gamut colours. This is the distance from m to m', p to p' and q to q', as shown by the arrows in FIG. 5 and as given by:

$$\Delta E^*_{ab_{mm'}} = \sqrt{(L^*_m - L^*_{m'})^2 + (a^*_m - a^*_{m'})^2 + (b^*_m - b^*_{m'})^2} \quad (3)$$

$$\Delta E^*_{ab_{pp'}} = \sqrt{(L^*_p - L^*_{p'})^2 + (a^*_p - a^*_{p'})^2 + (b^*_p - b^*_{p'})^2} \quad (4)$$

$$\Delta E^*_{ab_{qq'}} = \sqrt{(L^*_q - L^*_{q'})^2 + (a^*_q - a^*_{q'})^2 + (b^*_q - b^*_{q'})^2} \quad (5)$$

The processor compares the out-of-gamut distances at step 264, and selects the colour having the greatest out-of-gamut distance to be the most remote colour. In this example, standard colour q is the most remote colour.

At step 265, the processor calculates a compression factor s. The processor calculates the colour difference from the reference point r to the colour co-ordinates q of the most remote colour and the colour difference from the reference point r to the boundary co-ordinates q' of that colour. The ratio of these two distances is the compression ratio s. This compression ratio s is such that the most remote colour q is brought back to lie exactly on the gamut boundary.

Namely:

$$\Delta E^*_{ab_{rq}} = \sqrt{(L^*_r - L^*_q)^2 + (a^*_r - a^*_q)^2 + (b^*_r - b^*_q)^2}$$

$$\Delta E^*_{ab_{rq'}} = \sqrt{(L^*_r - L^*_{q'})^2 + (a^*_r - a^*_{q'})^2 + (b^*_r - b^*_{q'})^2}$$

and $$s = \frac{\Delta E^*_{ab_{rq'}}}{\Delta E^*_{ab_{rq}}} \quad (6)$$

At step 266, the processor applies the compression ratio s to the colour co-ordinates of all the colours m, p, q to generate a set of adjusted co-ordinates for each colour. These are shown as m", p", q" on FIG. 5. As noted above, the compression ratio s brings the most remote colour q back to the gamut boundary such that q" and q' coincide. The adjusted co-ordinates are given by:

$$L^*_{m''} = s \cdot L^*_m \quad a^*_{m''} = s \cdot a^*_m \quad b^*_{m''} = s \cdot b^*_m$$

$$L^*_{p''} = s \cdot L^*_p \quad a^*_{p''} = s \cdot a^*_p \quad b^*_{p''} = s \cdot b^*_p$$

$$L^*_{q''} = s \cdot L^*_q \quad a^*_{q''} = s \cdot a^*_q \quad b^*_{q''} = s \cdot b^*_q$$

At step 267, the processor adjusts the adjusted co-ordinates of the sample colour m" to obtain compensated co-ordinates m''' that preserve the colour differences for the adjusted colours such that they match the colour differences of the actual colours.

The processor determines the colour differences between the adjusted sample colour point m" and the adjusted colours p", q".

$$\Delta E^*_{ab_{m''p''}} = \sqrt{(L^*_{m''} - L^*_{p''})^2 + (a^*_{m''} - a^*_{p''})^2 + (b^*_{m''} - b^*_{p''})^2} \quad (7)$$

$$\Delta E^*_{ab_{m''q''}} = \sqrt{(L^*_{m''} - L^*_{q''})^2 + (a^*_{m''} - a^*_{q''})^2 + (b^*_{m''} - b^*_{q''})^2} \quad (8)$$

The adjusted co-ordinates m" of the adjusted sample colour are altered by the processor to apply a colour shift according to some criterion such as hue constancy or saturation constancy. In this example, the colour shift preserves hue, i.e. the shift is along the line extending back to the white point. The compensated co-ordinates m''' are varied and tested against two conditions: (a) that the colour difference given by equation (7) must match the colour difference given by equation (1), and (b) that the colour difference given by equation (8) must match the colour difference given by equation (2). Namely:

$$\Delta E^*_{ab_{m'''p''}} = \Delta E^*_{ab_{mp}} \quad (9)$$

$$\Delta E^*_{ab_{m'''q''}} = \Delta E^*_{ab_{mq}} \quad (10)$$

Figure 6:
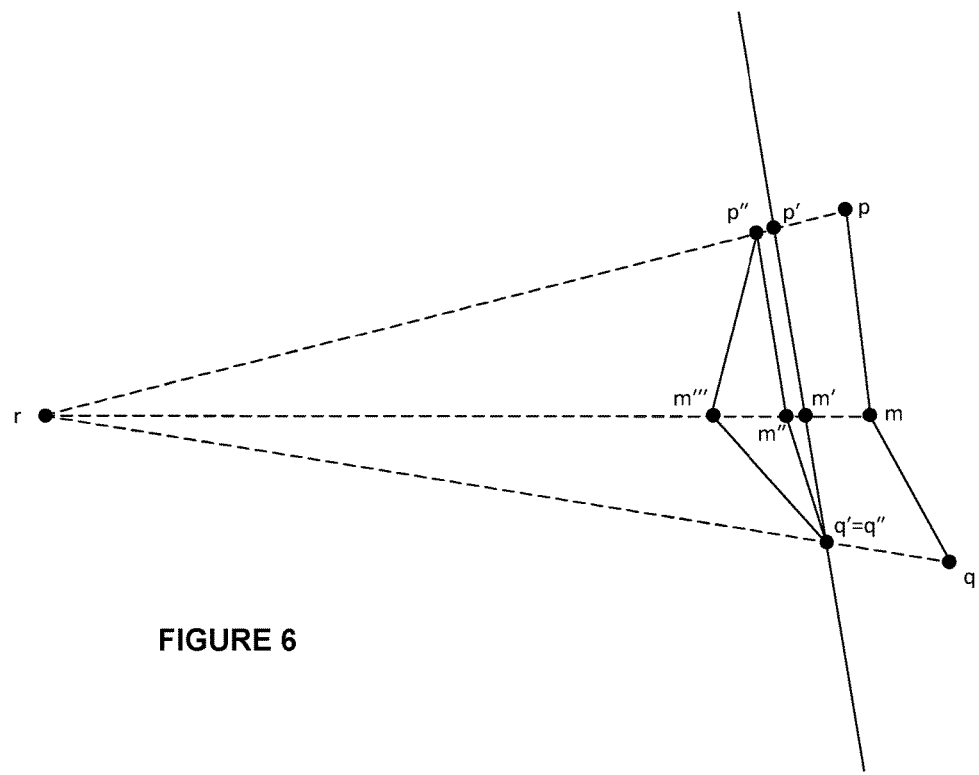
FIG. 6 is a sketch to show how the co-ordinates of the sample colour are adjusted to ensure that the separation between the adjusted sample and standard colours is the same as the separation of the actual sample and standard colours.

FIG. 6 illustrates this shift, although within the limits of the two-dimensional figure. It should be remembered that the colour space is three dimensional but that the lightness axis is not shown in FIG. 6. A compensation to the lightness value of the sample colour may be used to preserve the differences to the standard colours, either as an alternative to or in addition to a compensation of the saturation value. The hue value of the sample colour may be compensated as well, although it is preferred not to adjust this value.

As will be seen from FIG. 6, after compensating the co-ordinates of the sample colour, the corresponding distances are equal, such that when the adjusted colours (i.e. the colour having the compensated co-ordinates of the sample colour and the colours having the adjusted co-ordinates of the standard colours) are shown on the display, the difference in colours is preserved. Specifically, the closeness of the adjusted sample colour to each of the adjusted two standard colours is exactly the same as for the actual colours. Hence, the colorimeter allows a user to visualise the closeness of the sample colour to the two closest standards notwithstanding the fact that the sample colour and/or reference colours are outside the display gamut.

There are circumstances where compensating the adjusted co-ordinates m" of the sample colour to preserve equal colour distances will cause the compensated co-ordinates m''' to move out of gamut. For example, when the principal colour is the most remote colour, compensating the adjusted co-ordinates m" to preserve equal colour distances will see the compensated co-ordinates m''' move away from the reference point r. As the adjusted co-ordinates m" will lie on the gamut boundary (because the principal colour was the most remote colour), then the compensated co-ordinates m''' will move back out of gamut if the method above is practised.

This may be avoided in many different ways. For example, an alternative method may be used where the adjusted co-ordinates p", q" of the standard colours are compensated rather than compensating the adjusted co-ordinates m" of the sample colour. Another example is shown by step 268 of FIG. 4, as will now be described.

At step 268, the processor determines whether all colours remain within the display gamut. This may be determined as per the method previously used at step 230 of FIG. 3, except that the compensated co-ordinates m''' and the adjusted co-ordinates p", q" (for which no compensated co-ordinates are calculated) are used rather than the colour co-ordinates m, p, q. Rather than testing the co-ordinates of all colours, the co-ordinates of just the sample colour may be tested.

If all the adjusted colours, i.e. the compensated co-ordinates m''' and the adjusted co-ordinates p", q", are found to be in gamut, the method may continue to steps 270 and 280 of FIG. 3 that sees the adjusted colours displayed. However, if one or more of the adjusted colours is found to be out of gamut at step 268, then the method enters a loop via step 269. At step 269, an adjustment is made to try and ensure all colours remain in gamut. Three different techniques are shown in step 269, namely adjusting the compensation factor, moving the reference point or adjusting the compensated co-ordinates of the sample colour. One of these alternatives is selected at step 269. Each of the techniques will now be described in more detail, followed by a description of how a technique is selected.

As a first alternative, the compression factor may be adjusted by introducing a scaling factor at step 269 before returning to step 265. Step 265 sees the compression ratio s calculated again according to a modification of equation (6) above, namely such that:

$$s = w \times \frac{\Delta E^*_{ab_{rq'}}}{\Delta E^*_{ab_{rq}}} \quad (7)$$

Hence, the ratio of distances previously used is now multiplied by a scaling factor w. This scaling factor w sees the most remote colour brought back further into gamut. This technique may be repeated multiple times to try and bring all the adjusted and compensated colours into gamut. For the first iteration of the loop, the scaling factor w may be set to 0.95 and may then be decreased in 0.05 steps for each successive iteration. Thus, the scaling factor w sees the most remote colour brought back further and further into gamut at each iteration until the compensation routine of step 267 no longer moves the principal colour back out of gamut. However, in some circumstances, this technique will not be successful. To address this, a further test may be introduced, namely to test the result of the first iteration. If the first iteration is found to result in the compensation routine of step 267 moving the principal colour further out of gamut than before, then further iterations of this technique may not be attempted. Instead, one of the other techniques of step 269 may be attempted.

The second alternative of step 269 is to move the reference point. For example, the reference point may have been set to be out of gamut in which case the reference point may be moved such that it is in gamut. Also, the reference point may have been set to be within gamut, but away from the origin of the colour space, in which case the reference point may be moved closer towards the origin or moved to the origin. Once the reference point has been moved in step 269, the method returns to step 262, as shown in FIG. 4. Again, this technique may be performed iteratively such that different positions of the reference point may be tried and tested. For example, the reference point may be moved progressively towards the origin of the colour space.

The third alternative of step 269 is to adjust how the co-ordinates of the adjusted sample colour are compensated. Examples of how the co-ordinates may be compensated have been described above, for example to maintain hue constancy or saturation constancy. These different techniques may be tried in turn by iteratively applying this third technique. By way of example, the co-ordinates may have been compensated by adjusting saturation while preserving hue and lightness. At step 269, it may be decided to adjust saturation and lightness while preserving hue. The method then returns to step 267 where the compensated co-ordinates are calculated using the new approach. If this fails such that the compensated co-ordinates calculated at step 267 remain out-of-gamut, the next iteration of step 269 may see the co-ordinates compensated by adjusting saturation, hue and lightness.

The order in which the techniques of step 269 are attempted may be varied according to preference. For instance, first adjusting the compression factor may be attempted, then adjusting the reference point and finally adjusting how the compensated co-ordinates are calculated. The order does not matter as the method performs the check at step 268 to see whether all colours remain in gamut, and will keep making adjustments until the check is passed (a limit to the number of iterations may be put in place to guard against endless loops where it is impossible to keep all colours in gamut). A targeted approach to selecting the order may be taken. For example, a test may be used for certain conditions such as whether the reference point is already set to the origin (in which case adjusting the reference point may not be attempted) or whether step 267 has been performed by varying saturation, hue and lightness (in which case adjusting how the compensated co-ordinates are calculated may not be attempted).

Figure 4:
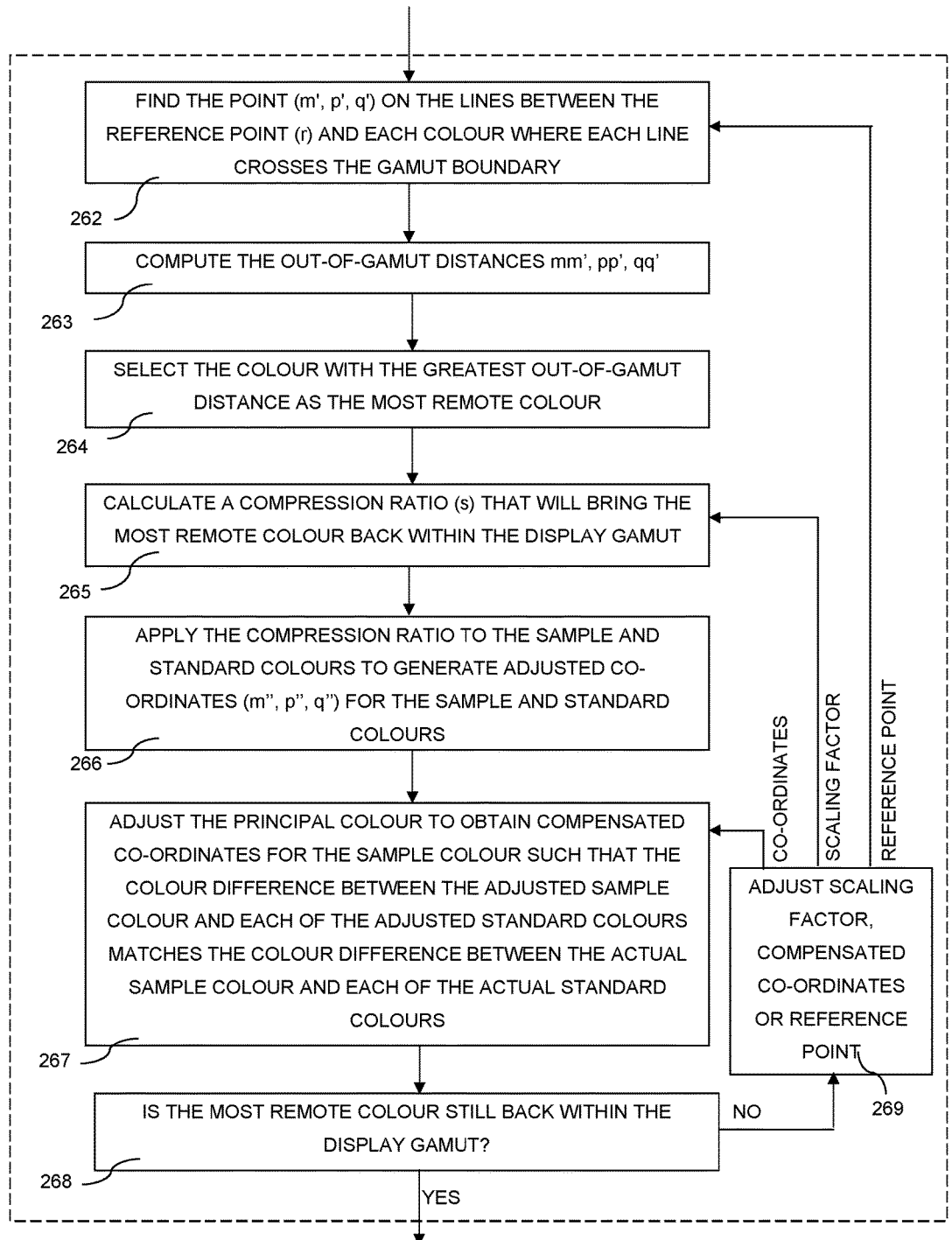
FIG. 4 is a schematic representation showing the step of generating adjusted colours from FIG. 3 in greater detail.

Once the test at step 268 is passed, the method of FIG. 4 is left to proceed to steps 270 and 280 of FIG. 3 that sees the adjusted colours displayed by the colorimeter. An example of a suitable display is shown in FIG. 7.

Figure 7:
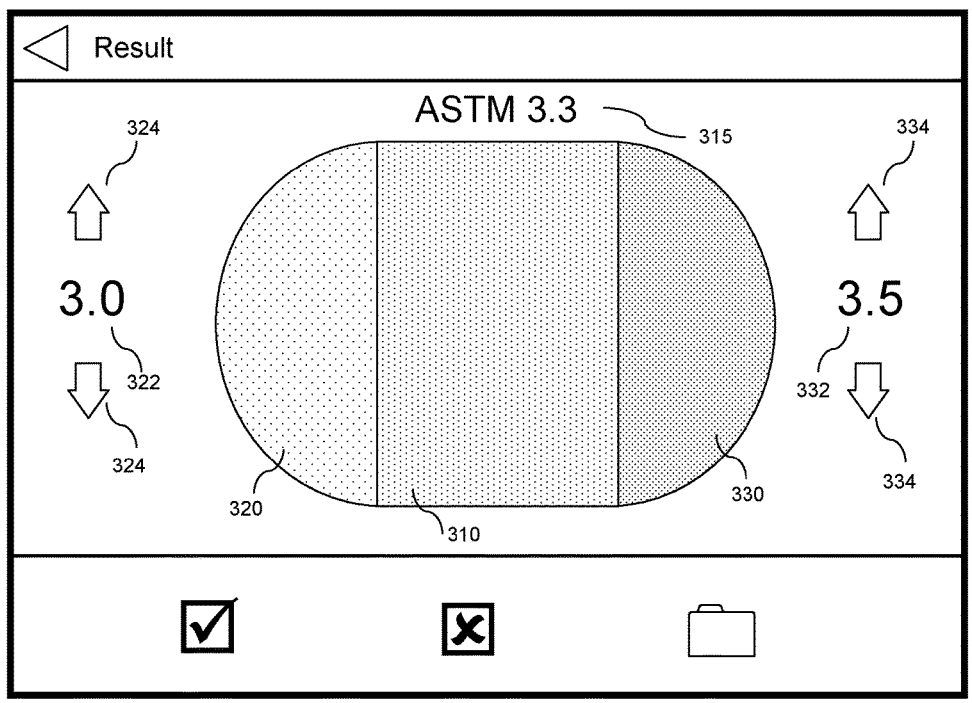
FIG. 7 is a screenshot from a colorimeter showing a measured sample colour displayed between two reference colours.

FIG. 7 shows a screenshot of the colorimeter displaying colour representations of the sample colour 310 in-between the closest two standard colours 320 and 330. Of course, the display could be the adjusted sample colour in-between the two adjusted standard colours. A numerical indication of the colour determined for the sample colour is provided at 315. In this example, the indication identifies the sample colour according to visual units in the ASTM scale (3.3 in this case). A numerical indication 322, 332 of the nearest standard colours are provided alongside the colour representation 320, 330 of the standard colours. In this case, the two nearest standard colours have 3.0 and 3.5 visual units on the ASTM scale. The display also shows arrows 324, 334 above and below the numerical indications 322, 322. These allow the user to change one or both the standard colours that are displayed. For example, if the up arrow 334 is selected, the colorimeter will display the standard colour with 4.0 visual units at 330 and will update the numerical display 332 to reflect the new colour. Hence, the user may see how the sample colour compares to other more distant colours.

When the colorimeter is displaying adjusted colours at 310, 320 and 330, the numerical displays may provide numerical indications of the actual colours at 322 and 332, along with a textual or graphical indication that adjusted colours are being displayed. Further, numerical indications of the adjusted colours may be displayed in addition to the numerical indications of the actual colours.

As will be appreciated, many of the features of the second embodiment may be used with the first embodiment.

A skilled person would appreciate that the above embodiment may be varied in many different respects without departing from the appended claims.

The invention claimed is:

1. A method of displaying colours on an electronic visual display such as a television set or computer monitor, the colours corresponding to a principal colour and one or two auxiliary colours wherein each of the principal and auxiliary colours are defined by colour co-ordinates within a colour space, the method comprising:
   determining if one or more of the principal and auxiliary colours is out of the gamut of the display; and
   if yes:
   determining the most remote colour from the principal and auxiliary colours determined to be out of the gamut of the display by identifying the colour with colour co-ordinates furthest from the gamut boundary of the display;
   determining a compression factor to bring the most remote colour within the gamut of the display;
   applying the compression factor to the colour co-ordinates for each of the principal and auxiliary colours to determine adjusted co-ordinates for each of the principal and auxiliary colours; and
   determining compensated co-ordinates for the principal colour that meet a condition that, for each pair of the principal colour and one of the one or two auxiliary colours, the distance between the compensated co-ordinates of the principal colour and the adjusted co-ordinates of the auxiliary colour matches the distance between the colour co-ordinates of the principal colour and the colour co-ordinates of the auxiliary colour; and
   displaying, on the display, an adjusted principal colour corresponding to a colour having the compensated co-ordinates in the colour space and adjusted auxiliary colours each corresponding to a colour having the adjusted co-ordinates in the colour space for each of the one or two auxiliary colours.

2. The method of claim 1, wherein determining the most remote colour comprises:
   determining boundary co-ordinates of the principal and auxiliary colours on the gamut boundary for each of the principal and auxiliary colours determined to be out of the gamut of the display by mapping from the colour co-ordinates of the colour towards a reference point in the colour system having co-ordinates within the gamut of the display;
   determining, for each of the principal and auxiliary colours determined to be out of the gamut of the display, an out-of-gamut distance between the boundary co-ordinates and the colour co-ordinates of the colour; and
   determining the most remote colour from the out-of-gamut distances, by identifying the colour with the greatest out-of-gamut distance; and, optionally,
   wherein the reference point is chosen to be the origin of the colour system.

3. The method of claim 2, wherein obtaining boundary co-ordinates of the principal and auxiliary colours on the gamut boundary of the display comprises, for each of the principal and auxiliary colours, determining where a line extending from the colour co-ordinates of the colour to the reference point intersects the gamut boundary.

4. The method of claim 3, wherein the colour system has a co-ordinate system relating lightness, hue and saturation, and wherein the line extends in a direction of constant hue and, optionally, the reference point has zero saturation.

5. The method of claim 4, wherein the reference point has a lightness co-ordinate matching that of co-ordinates of the principal colour or within the range extending from the maximum and minimum lightness values of the initial co-ordinates of the principal and auxiliary colours.

6. The method of claim 5, wherein determining a compression factor to bring the most remote colour within the gamut of the display comprises making the compression factor equal to a product of a scaling factor and a ratio of the distances between the reference point and the boundary co-ordinates of the most remote colour and between the reference point and the initial co-ordinates of the most remote colour and, optionally, wherein the scaling factor has a value in the range from 0.5 to 1.

7. The method of claim 5, wherein determining a compression factor to bring the most remote colour within the gamut of the display comprises:
generating an estimated compression factor, applying the estimated compression factor to the boundary co-ordinates for each of the principal and auxiliary colours to determine adjusted co-ordinates for each of the principal and auxiliary colours,
determining whether the adjusted co-ordinates for each of the principal and auxiliary colours are within the gamut of the display and,
if not, repeatedly
generating an estimated compression factor,
applying the estimated compression factor to the boundary co-ordinates for each of the principal and auxiliary colours to determine adjusted co-ordinates for each of the principal and auxiliary colours, and
determining whether the adjusted co-ordinates for each of the principal and auxiliary colours are within the gamut of the display
until the adjusted co-ordinates for each of the principal and auxiliary colours are determined to be within the gamut of the display.

8. The method of claim 2, wherein determining a compression factor to bring the most remote colour within the gamut of the display comprises making the compression factor equal to a product of a scaling factor and a ratio of the distances between the reference point and the boundary co-ordinates of the most remote colour and between the reference point and initial co-ordinates of the most remote colour and, optionally, wherein the scaling factor has a value in the range from 0.5 to 1.

9. The method of claim 8, further comprising, after each determination of the compensated co-ordinates, determining if the compensated co-ordinates of the principal colour are out of the gamut of the display and, if yes, the method further comprises one of:
(a) repeating the steps of determining the compression factor, applying the compression factor and determining compensated co-ordinates for the principal colour, wherein, at each iteration, the compression factor is made smaller by reducing the scaling factor;
(b) moving the reference point to be closer to the origin of the colour system or to the origin of the colour system, and repeating the steps of determining the most remote colour, determining the compression factor, applying the compression factor and determining compensated co-ordinates for the principal colour; or
(c) repeating the step of determining compensated co-ordinates for the principal colour by adjusting and preserving different combinations of the co-ordinate values for saturation, lightness and hue of the principal colour.

10. The method of claim 2, wherein determining a compression factor to bring the most remote colour within the gamut of the display comprises:
generating an estimated compression factor, applying the estimated compression factor to the boundary co-ordinates for each of the principal and auxiliary colours to determine adjusted co-ordinates for each of the principal and auxiliary colours,
determining whether the adjusted co-ordinates for each of the principal and auxiliary colours are within the gamut of the display and,
if not, repeatedly
generating an estimated compression factor,
applying the estimated compression factor to the boundary co-ordinates for each of the principal and auxiliary colours to determine adjusted co-ordinates for each of the principal and auxiliary colours, and
determining whether the adjusted co-ordinates for each of the principal and auxiliary colours are within the gamut of the display
until the adjusted co-ordinates for each of the principal and auxiliary colours are determined to be within the gamut of the display.

11. The method of claim 1, wherein determining compensated co-ordinates for the principal colour, which has a particular hue, comprises adjusting the co-ordinates from the adjusted co-ordinates of the principal colour so as to preserve the hue of the principal colour.

12. A method of grading the colour of a colour sample and displaying a colour and one or two other colours to illustrate the colour grading performed, the method comprising: obtaining colour co-ordinates of a principal colour by measuring the colour of the sample to determine colour co-ordinates of the sample that define the colour in a colour space; obtaining the colour co-ordinates of one or two auxiliary colours by identifying one or two reference colours that correspond to the principal colour and obtaining the colour co-ordinates of the identified one or two reference colours that define the colours in the colour space; and performing the method of displaying colours on an electronic visual display of claim 1.

13. The method of claim 12, wherein identifying one or two reference colours comprises:
selecting candidate reference colours, and obtaining colour co-ordinates of the candidate reference colours that define the colours in the colour space,
determining the distance between the colour co-ordinates of the principal colour and the colour co-ordinates of each of the candidate reference colours, and
selecting the one or two candidate reference colours having the shortest distances as the one or two auxiliary colours.

14. The method of claim 13, wherein selecting the candidate reference colours having the shortest distances as the auxiliary colours comprises selecting two auxiliary colours corresponding to the two candidate reference colours having the shortest distances.

15. A non-transitory computer readable medium storing a computer program that, when executed on a computer processor, causes the processor to perform the method of claim 1.

16. A computer comprising a computer processor, computer memory and an electronic visual display, wherein the computer memory has stored therein a computer program that, when executed on a computer processor, causes the processor to perform the method of claim 1.

17. A colorimeter comprising a computer processor, computer memory and an electronic visual display, wherein the computer memory has stored therein a computer program that, when executed on a computer processor, causes the processor to perform the method of claim 12.

18. A non-transitory computer readable medium storing a computer program that, when executed on a computer processor, causes the processor to perform the method of claim 12.

* * * * *